(12) United States Patent
Ewert et al.

(10) Patent No.: US 9,981,763 B2
(45) Date of Patent: May 29, 2018

(54) SYSTEM AND METHOD FOR OVERWRAPPING FOODS PRODUCTS USING LASER PERFORATED FILM

(71) Applicant: ODDS, LLC, Charlotte, NC (US)

(72) Inventors: Brian Ewert, Charlotte, NC (US); John Roberts, Charlotte, NC (US)

(73) Assignee: ODDS, LLC, Charlotte, NC (US)

( * ) Notice: Subject to any disclaimer, the term of this patent is extended or adjusted under 35 U.S.C. 154(b) by 732 days.

(21) Appl. No.: 14/470,582

(22) Filed: Aug. 27, 2014

(65) Prior Publication Data

US 2015/0059293 A1 Mar. 5, 2015

Related U.S. Application Data

(60) Provisional application No. 61/870,900, filed on Aug. 28, 2013.

(51) Int. Cl.
*B23K 26/38* (2014.01)
*B23K 26/06* (2014.01)
(Continued)

(52) U.S. Cl.
CPC ............ *B65B 61/02* (2013.01); *B23K 26/032* (2013.01); *B23K 26/0622* (2015.10); *B23K 26/0846* (2013.01); *B23K 26/0869* (2013.01); *B23K 26/382* (2015.10); *B23K 26/402* (2013.01); *B23K 37/0235* (2013.01); *B65B 11/08* (2013.01); *B65B 25/04* (2013.01); *B65B 25/065* (2013.01); *B65B 41/18* (2013.01);
(Continued)

(58) Field of Classification Search
CPC .............. B23K 26/382; B23K 26/389; B23K 26/0626; B65B 61/02
See application file for complete search history.

(56) References Cited

U.S. PATENT DOCUMENTS 4,178,740 A 12/1979 Groom et al.
4,719,342 A * 1/1988 Cohn .................. H01S 3/0064
219/121.62
(Continued)

FOREIGN PATENT DOCUMENTS

CA 1 273 905 9/1990
EP 0 206 843 A1 12/1986
(Continued)

OTHER PUBLICATIONS

Machine translation of EP 1,647,489, Jun. 2017.*
(Continued)

*Primary Examiner* — Geoffrey S Evans
(74) *Attorney, Agent, or Firm* — Tuggle Duggins P.A.; Blake Hurt

(57) ABSTRACT

A food packaging system including a film dispensing device and a perforation device configured to create perforations in a film dispensed by the film dispensing device. The system also includes a wrapping device configured to wrap a food product in the film, and a controller configured to control the perforation device to produce a predetermined perforation pattern in the film. The film extends continuously while moving from the dispensing device to the wrapping device. The perforation device is positioned so that the film is perforated after leaving the dispenser and prior to the food product being wrapped in film.

15 Claims, 2 Drawing Sheets

(51) Int. Cl.
*B65B 61/02* (2006.01)
*B65B 11/08* (2006.01)
*B65B 25/04* (2006.01)
*B65B 25/06* (2006.01)
*B23K 37/02* (2006.01)
*B23K 26/03* (2006.01)
*B23K 26/08* (2014.01)
*B23K 26/0622* (2014.01)
*B23K 26/382* (2014.01)
*B23K 26/402* (2014.01)
*B65B 41/18* (2006.01)
*B65B 57/08* (2006.01)
*B65B 41/12* (2006.01)
*B23K 103/00* (2006.01)

(52) U.S. Cl.
CPC .......... *B65B 57/08* (2013.01); *B23K 2203/42* (2015.10); *B65B 41/12* (2013.01)

(56) References Cited

U.S. PATENT DOCUMENTS

| | | | |
|---|---|---|---|
| 5,001,325 A | 3/1991 | Huizinga | |
| 5,014,489 A | 5/1991 | Terminella et al. | |
| 5,259,401 A * | 11/1993 | Lange ................... | A24C 5/007 131/280 |
| 5,408,224 A * | 4/1995 | Yamazaki ................ | G07C 3/00 340/309.7 |
| 6,046,427 A | 4/2000 | Richter et al. | |
| 6,441,340 B1 * | 8/2002 | Varriano-Marston ............ | B23K 26/0846 219/121.7 |
| 7,076,933 B2 | 7/2006 | Backus | |
| 8,220,375 B2 | 7/2012 | Boyer, Jr. | |
| 8,650,996 B2 | 2/2014 | Boyer, Jr. | |
| 8,847,114 B1 * | 9/2014 | Shin ...................... | B23K 26/02 219/121.71 |
| 2005/0252175 A1 | 11/2005 | Martin | |
| 2005/0263506 A1 * | 12/2005 | Masuda ............... | B23K 26/067 219/121.82 |
| 2006/0138098 A1 * | 6/2006 | Hiramatsu ............ | B23K 26/03 219/121.7 |
| 2006/0237406 A1 * | 10/2006 | Schmidt-Sandte .. | B23K 26/032 219/121.71 |
| 2007/0042885 A1 * | 2/2007 | Rietjens ............. | B23K 26/0846 493/59 |
| 2008/0179304 A1 * | 7/2008 | Osako .................... | B23K 26/38 219/121.85 |
| 2009/0045176 A1 * | 2/2009 | Wawers ................. | G02B 27/40 219/121.67 |
| 2010/0016137 A1 * | 1/2010 | Benedetti ................ | B65B 41/16 493/162 |
| 2012/0266563 A1 | 10/2012 | Baartmans | |
| 2013/0102449 A1 | 4/2013 | Graboski et al. | |

FOREIGN PATENT DOCUMENTS

| | | |
|---|---|---|
| EP | 1 647 489 A2 | 4/2006 |
| EP | 1647489 A2 * | 4/2006 |
| EP | 2 602 047 A1 | 6/2013 |
| JP | 1-228693 A * | 9/1989 |

OTHER PUBLICATIONS

International Search Report dated Dec. 9, 2014 issued in connection with International Application No. PCT/US14/52890.
Written Opinion dated Dec. 9, 2014 issued in connection with International Application No. PCT/US14/52890.
European Search Report for European Patent Application No. 14840142.5 dated Apr. 5, 2017.

* cited by examiner

SYSTEM AND METHOD FOR OVERWRAPPING FOODS PRODUCTS USING LASER PERFORATED FILM

CROSS REFERENCE TO RELATED APPLICATIONS

The present application claims priority to and the benefit of U.S. Provisional Patent Application No. 61/870,900, filed Aug. 28, 2013. The foregoing provisional application is incorporated by reference herein in its entirety.

BACKGROUND

The present application relates generally to the field of food product packaging. More specifically, the present application relates to a packaging system including a perforation system that forms a multitude of small openings or perforations in a plastic film for use in the packaging of a food product in a wrapping system.

Instead of being processed and packaged by a butcher at a retail location, carcasses are commonly cut at a meat packing location and shipped to the retail location as what is commonly known as case-ready (e.g., store-ready, shelf-ready, etc.) meat. Case-ready meat is shipped in vacuum packages or modified atmosphere packages (e.g., an atmosphere with a specific concentration of gasses such as nitrogen, carbon dioxide, carbon-monoxide, etc.) (MAP) to delay spoilage of the meat such that it can be shipped and have a desired shelf life at the retail location. The portions of meat are generally first individually wrapped in a film and then several wrapped cuts of meat are packaged in an outer vacuum packages or MAP. At the retail location, the outer packaging may be opened and the individually wrapped cuts of meat may then be placed on the shelf for purchase. The lack of oxygen in vacuum packages and some MAP can cause the meat to appear in its "true" color (e.g., dark reddish purple for beef and dark pink for pork). While this does not mean the meat is spoiled, consumers may be less likely to purchase the meat because it is not a more desirable color (e.g., bright red for beef and bright pink for pork), which is often associated with freshness. The film in which the individual portions of meat are wrapped may be perforated and oxygen permeable such that the meat can be exposed to oxygen once the outer packaging is opened and turn to a more desirable color when on the shelf.

Traditionally, a perforated film is provided on a roll at the meat packing location and used to individually wrap the meat. The perforations can make the film more susceptible to damage during the process as it is fed from the roll, resulting in an incorrectly packaged portion of meat or a disruption in the packaging process from having to stop a machine, remove a damaged portion of film, and reset the machine.

BRIEF DESCRIPTION OF THE DRAWINGS

Features, aspects, and advantages of the present invention will become apparent from the following description and the accompanying exemplary embodiments shown in the drawings, which are briefly described below.

DETAILED DESCRIPTION

It is to be understood that the following detailed description are exemplary and explanatory only, and are not restrictive of the invention.

The packaging system described herein provides a novel system for wrapping a food product in a perforated film. The packaging system is connected to the wrapping system such that an un-perforated film is fed from a roll, perforated, and then provided to the wrapping system with a minimal amount of handling between the perforation system and the wrapping system.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Figure 1:
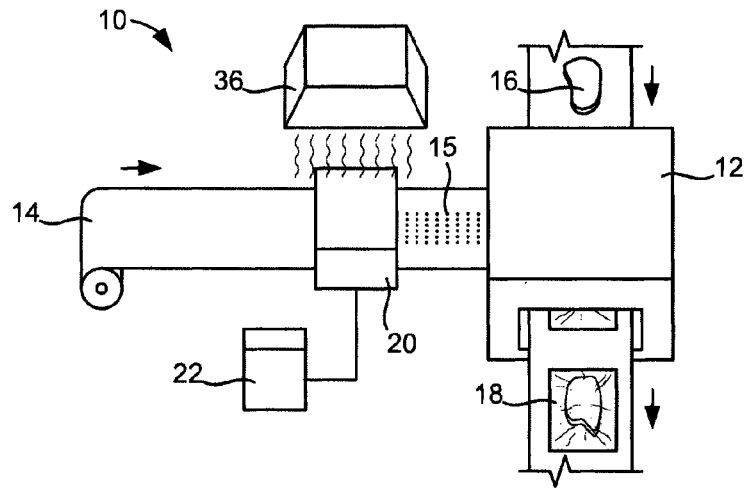
FIG. 1 is a schematic view of a food product wrapping system, according to an exemplary embodiment.

Referring to FIG. 1, a packaging system 10 is shown according to an exemplary embodiment. The packaging system 10 includes a wrapping system 12 configured to wrap a food product 16 in a film 14. According to an exemplary embodiment, the film 14 is a polymer film (e.g., polypropylene film). For example, the wrapping system 12 may fold or wrap the film 14 around the food product and seal the layers of the film 14 together around the food product 16 to form a packaged food product 18. The film 14 may be pre-printed with indicia or information (e.g., labels, graphics, nutritional information, price tags, cooking instructions, etc.). The film 14 includes a multitude of openings, shown as perforations 15 to allow the film 14 to be semi-permeable to a gas such as oxygen. In one embodiment, the perforations 15 may be generally circular holes. In other embodiments, the perforations 15 may be another shape, (e.g., a slot, slit, etc.)

The packaged food product 18 may be subject to further processing after being wrapped in the wrapping device or system 12, such as being placed on a tray and/or wrapped or placed in an outer packaging. The outer packaging, for example, may be a vacuum package, or a MAP to provide case-ready packaging for the food product.

According to an exemplary embodiment, the food product 16 is a meat product (e.g., a portion of ground meat, whole muscle meat, etc.). In another embodiment, the food product packaging system 10 may be configured to package a food product formed completely or partially of vegetable material, soy, bread, or another food product that may benefit from being packaged in a perforated film.

The film 14 is provided in an un-perforated form (e.g., on a roll or other storage and dispensing device) and fed to the wrapping system 12. As shown in FIG. 1, the film 14 may extend continuously from the dispensing device (e.g., roll) to the wrapping device 12. The perforations 15 are formed in the film 14 by a perforation device or system 20 that is provided in close proximity to the wrapping system 12 such that there is minimal routing and handling of the perforated film 14 between the perforation system 20 and the wrapping system 12, reducing the likelihood of tears or ruptures in the film 14. In some embodiments, the perforation system 20 may be integrated into the wrapping system 12. A control system (i.e., control device or controller) 22 coordinates the operation of the perforation system 20 with the feed of the film 14 such that the perforations 15 are formed in the film 14 at a desired spacing or concentration.

Figure 2:
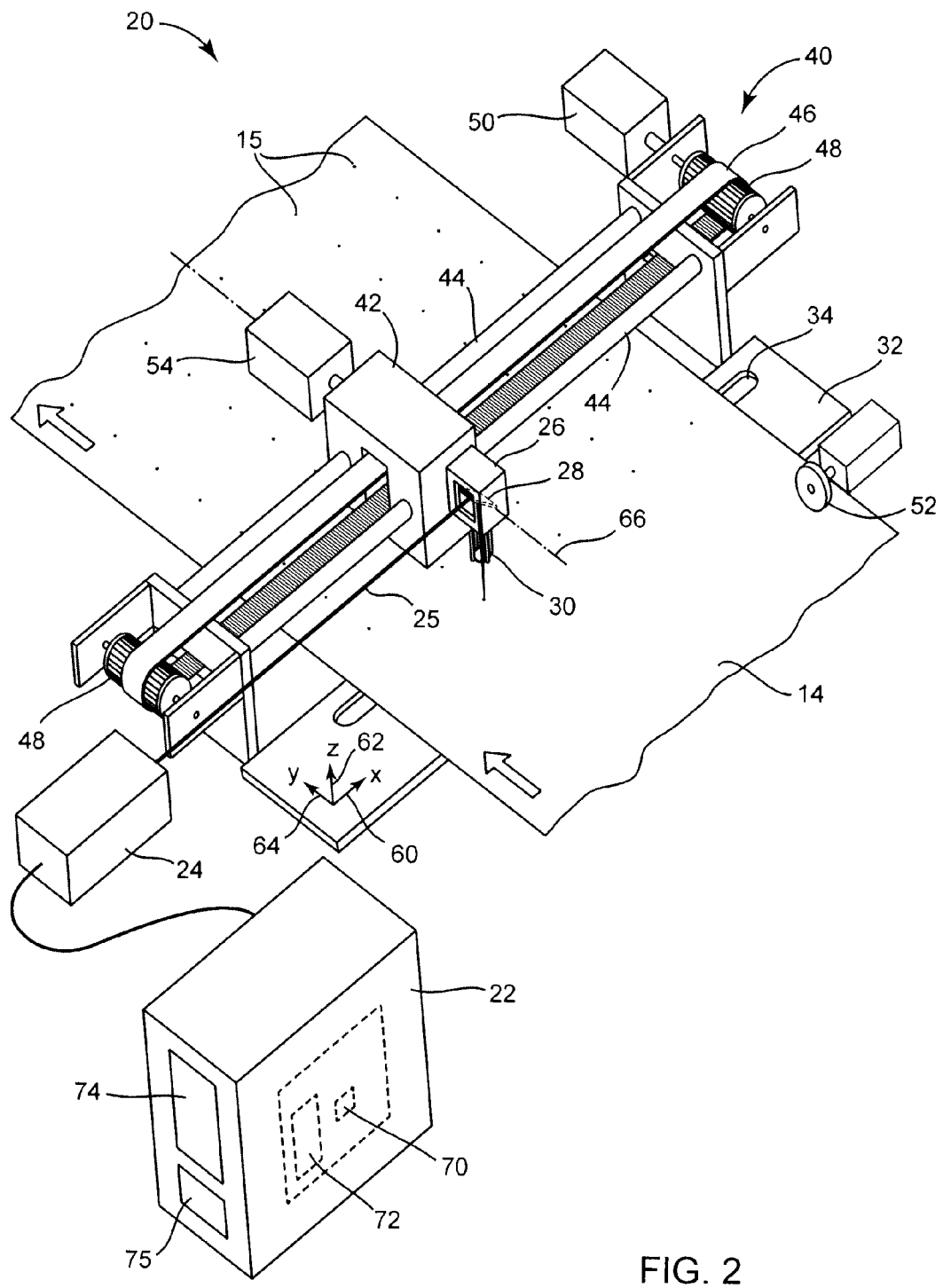
FIG. 2 is a schematic perspective view of a perforation device for the food wrapping system of FIG. 1, according to an exemplary embodiment.

Referring to FIG. 2, the perforation system 20 and the control system 22 are shown according to an exemplary embodiment. The perforation system 20 includes a laser emitter 24 configured to project a laser beam 25 at the film 14 to create the perforation 15 in the film 14. According to an exemplary embodiment, the laser emitter 24 is a $CO_2$ laser generating an infrared beam 25 that is approximately ¼" in diameter and a power output that is capable of burning through the material of the film 14. In one embodiment, the laser emitter 24 is positioned to the side of the film 14 and projects the laser beam 25 in horizontal direction, directed at a laser head 26 positioned above the film 14. In other embodiments, the laser emitter 24 may be positioned elsewhere, such as above the laser head 26 or integrated into the laser head 26. The beam 25 is directed (e.g., reflected) downward by a mirror 28 towards the film 14 and focused at the film 14 by a converging lens 30 to burn the perforation 15 in the film 14. The laser head 26 is movable in a lateral direction along an x-axis 60 to create a line of perforations 15 at various locations along the width of the film 14.

The focal length of the converging lens 30 may be adjusted to create a perforation of a desired diameter. The diameter of the perforations 15 are further controlled by controlling the duration of the laser pulse and the power of the laser beam 25. According to an exemplary embodiment, the perforations 15 have a diameter between 5 microns and 250 microns (0.0002 in. and 0.01 in.). According to a preferred embodiment, the perforations 15 have a diameter of approximately 75 microns (0.003 in.).

A support plate 32 is positioned below the film 14 and the laser head 26 such that the film 14 is tensioned over the upper surface of the support plate 32 in the proximity of the laser head 26. The support plate 32 flattens the film 14 in and helps to maintain a controllable and consistent distance between the film 14 and the laser head 26. The distance between the support plate 32 and the laser head 26 may be varied by adjusting the position of the laser head 26 and/or the support plate 32 (e.g., along a z-axis 62) to vary the diameter of the perforation 15 formed in the film 14 by the beam 25. The support plate 32 includes an opening 34 aligned with the laser head 26 and positioned below the location at which the laser head 26 focuses the beam 25 such that the beam 25 can pass through the opening 34 after penetrating the film 14. According to an exemplary embodiment, the opening 34 is a slot with a width that is greater than the diameter of the largest potential perforation. In other embodiments, the opening 34 may be otherwise shaped. For example, the opening 34 may include a multitude of separate holes aligned with potential locations at which perforations 15 may be formed in the film 14.

One or more sensors 36 may be positioned beneath the support plate 32. The sensor 36 detects the presence of the laser beam 25 to detect if the laser beam 25 has burned through the film 14 and has created the perforation 15. The sensor 36 may be, for example, a heat sensor. In one embodiment, a single sensor 36 is positioned beneath the support plate 32 and is aligned with one of the positions at which a perforation 15 may be formed in the film 14 to spot check the operation of the perforation system 20. In another embodiment, multiple sensors may be positioned beneath the support plate 32 and aligned with multiple positions at which a perforation 15 may be formed in the film 14 to perform a more comprehensive check of the operation of the perforation system 20. In yet another embodiment, a single sensor may extend along the entire width of the support plate 32 such that it is capable of detecting the penetration of the laser beam 25 at any point along the width of the film 14. In yet another embodiment, the sensor 36 may be coupled to the laser head 26 and may move relative to the film 14 and the support plate 32 with the laser head 26.

A ventilation system 38 (e.g., exhaust system, suction system, vacuum system, etc.) may be provided proximate the perforation system 20 (see FIG. 1). The ventilation system 38 is configured to collect any vapors or other byproducts created when the laser beam 25 burns through the film 14 and remove them from the area of the perforation system 20. The ventilation system 38 may, for example, include a vent hood positioned above the perforation system 20.

The laser head 26 is moveable to form perforations 15 at various positions along the width of the film 14. According to an exemplary embodiment, the laser head 26 is moveable along the x-axis 60 with a shuttle mechanism 40. The laser head 26 is coupled to a shuttle or slide 42 that moves along rails 44. The slide 42 is fixed to a timing belt 46 that extends around pulleys 48 positioned on either side of the shuttle mechanism 40. At least one of the pulleys 48 is rotated by a motor 50 to move the timing belt 46. The laser head 26 is therefore moved through the interconnection of the timing belt 46, the slide 42, and the laser head 26, to vary the position along the x-axis 60 of the perforation 15 formed in the film 14.

To form a row of perforations 15, the laser head 26 is moved to a desired position and the laser emitter 24 is activated. The beam 25 is directed towards the film 14 and burns through the film 14 to form the first perforation 15. The laser emitter 24 is then deactivated and the motor 50 is rotated to advance the laser head 26 to a new position. The process is repeated until a desired number of perforations 15 have been made in the row. The perforations 15 may be formed over only a portion of the width of the film 14. The perforations 15 may be formed over the entire width of the film 14 or may be formed over only a portion of the film 14. For example, the film 14 may have a width of approximately 18 in. while the perforations 15 are only formed in a portion having a width of approximately 6 in (e.g., in a strip down the center of the film 14). The perforations 15 need not be regularly spaced. In other embodiments, the perforations 15 may have varied spacing (e.g., a higher concentration of perforations 15 in the center of the film 14 than towards the edges of the film 14) or may be randomly located. The perforations may be randomly distributed throughout the film.

Subsequent rows of perforations 15 are formed as the film 14 is advanced relative to the perforation system 20 (e.g., along a y-axis 64). The film 14 may be advanced continuously. To reduce the cycle time, a first row of perforations 15 may be is formed with the laser head 26 moving in a first direction, while the next row of perforations 15 is formed with the laser head 26 moving back in the opposite direction. In one embodiment, the feed rate of the film 14 (e.g., the rate at which the film 14 moves along the y-axis 64) is detected with an encoder 52, shown in FIG. 2 as being positioned on the top surface of the film 14. The encoder 52 rotates as the film 14 advances and converts the angular motion into a digital signal that is utilized by the control system 22 to determine the feed rate of the film 14. The data provided by the encoder 52 may then be used by the control system 22 to time the movement of the laser head 26 along the x-axis 60 by the shuttle mechanism 40 (e.g., the traverse speed, interval at each perforation, time between cycles, etc.).

Other systems and methods may be used to coordinate the timing of the movement of the laser head 26 along the x-axis 60 with the feed rate of the film 14. In another embodiment, the feed mechanism for the film 14 may provide a pulse to the control system 22 at an interval related to the feed rate of the film 14. In yet another embodiment, the laser head 26 cycle time may be input directly by the operator, who may specify a desired cycle time using the control system 22. In yet another embodiment, the film 14 may include marks printed at regular intervals and the perforation system 20 may include a sensor (e.g., a registration sensor) that detects the marks, with the time between marks being used by the control system 22 to determine the speed of the film 14 and the timing of the shuttle mechanism 40.

Alternatively, the laser head 26 may be directed to form perforations 15 at different points by rotating instead of moving along the x-axis 60 with the shuttle mechanism 40. As shown in FIG. 2, the perforation system 20 may include a pivot motor 54. The pivot motor 54 rotates the laser head 26 about a rotational axis parallel to the y-axis 64. As the laser head 26 is rotated, it directs the laser beam 25 at an angle instead of vertically to a position directly below the laser head 26. The laser beam 25 may therefore be directed to any point along the width of the film 14 to create a perforation 15. According to an exemplary embodiment, the reflecting mirror 28 is positioned such that the rotational axis 66 passes through the reflecting mirror 28. The reflecting mirror 28 therefore remains in the path of the horizontal laser beam 25 as the pivot motor 54 rotates the laser head 26. The rotation of the laser head 26 with the pivot motor 54 may be timed by the control system 22 and coordinated with the feed rate of the film 14 to achieve a desired number and spacing of perforations 15 in each row and a desired spacing between rows.

Figure 3:
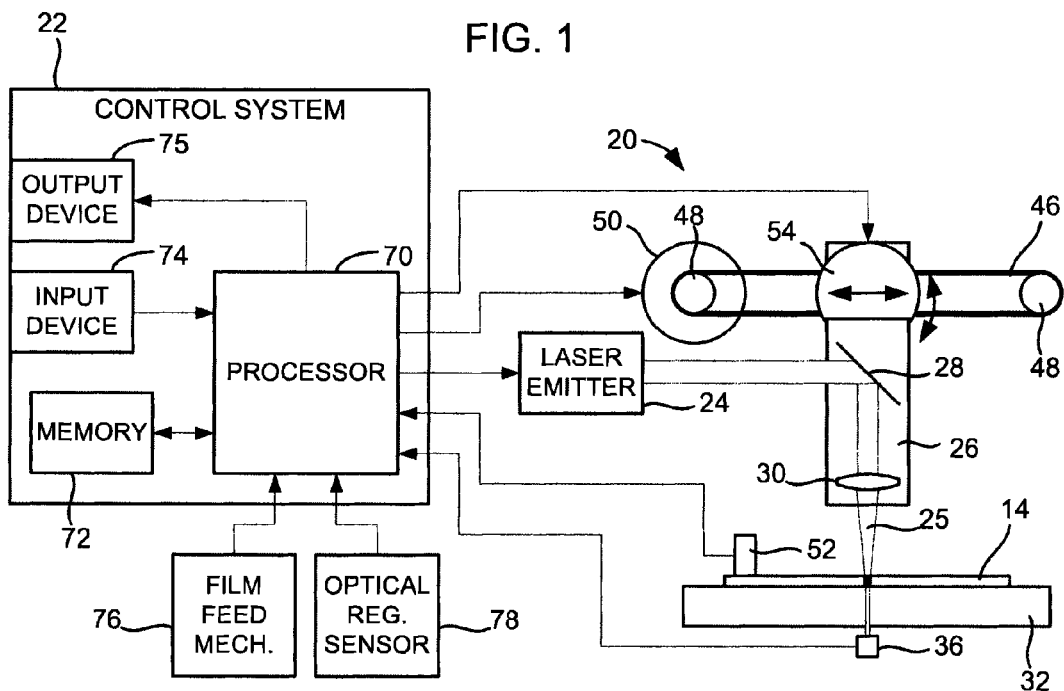
FIG. 3 is a block diagram of a control system for the perforation device of FIG. 2, according to an exemplary embodiment.

In some embodiments, as shown in FIG. 3, the perforation system 20 may include both the shuttle mechanism 40 and the pivot motor 54 such that the laser head 26 may be both moved along the x-axis 60 and may be rotated about the rotational axis 66. The pivot motor 54 may be fixed to the slide 42 and coupled to the laser head 26 with a shaft. The pivot motor 54 may be positioned on the opposite side of the slide 42 from the laser head 26 and the shaft may extend through an opening in the slide 42.

Referring to FIG. 3, a schematic block diagram of the control system 22 and the perforation system 20 are shown according to an exemplary embodiment. The control system 22 is configured to manage the operation of the perforation system 20 to achieve a desired pattern and/or concentration of perforations 15 in the film 14. In an exemplary embodiment, the control system 22 includes a processor 70, a memory device 72, a user input device 74, and an output device 75. According to an exemplary embodiment, components of the control system 22 may be housed in an industrial cabinet to protect the components from the elements.

The control system 22 is configured to determine the pattern of the perforations 15 by controlling the spacing of the perforations 15 in each row as well as the spacing between each row. The control system 22 may control the spacing of the perforations 15 through a variety of variables, such as the traverse speed of the laser head 26, the time interval at each perforation 15, the time interval between perforations, and the time interval between cycles. The control system 22 receives input from the encoder 52, or from another sensor input device such as a film feed mechanism 76 or a registration sensor 78 configured to detect marks printed on the film 14 as described above. The control system 22 also receives input from the sensor 36. The control system 22 sends outputs control signals to devices such as the laser emitter 24, the motor 50 of the shuttle mechanism 40, or the pivot motor 54. The control system 22 may monitor other properties related to the perforation system 20 including the life of the laser head 26, the supply of laser consumables, the operation of the ventilation system 38, and the operation of the wrapping system 12.

The processor 70 can be implemented as a general purpose processor, an application specific integrated circuit (ASIC), one or more field programmable gate arrays (FPGAs), a group of processing components, or other suitable electronic processing components. In another exemplary embodiment, the control system 22 may include a controller lacking a processor or memory. For example, the control system may be a linear circuit.

The memory device 72 (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device 72 may be or include volatile memory or non-volatile memory. The memory device 72 may include database components, object code components, script components, or any other type of information structure for supporting the various activities and information structures described in the present application. According to an exemplary embodiment, the memory device 72 is communicably connected to the processor via the processing circuit and includes computer code for executing (e.g., by processing circuit and/or processor) one or more processes described herein.

The input device 74 is one or more devices that allow a user to input commands and control variables for the perforation system 20. The input device 74 may be, for example, a touch screen monitor, a keyboard or keypad, push buttons, dials, switches, or any combination of devices. The output device 75 is one or more devices that allow a user to monitor the properties of the perforation system 20 and may be integrated with the input device 74. The output device 74 may be, for example, a monitor, a touch screen monitor, a text display, a numeric display, or a combination of devices.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

It is important to note that the construction and arrangement of the system and method for overwrapping foods products using laser perforated film as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A food packaging system comprising:
   a film dispensing device carrying a portion of film;
   a perforation device configured to create one or more perforations in the film dispensed by the film dispensing device, the perforation device comprising:
      a laser emitter configured to project a laser beam through a laser head in a direction of the film to create the one or more perforations in the film,
      a converging lens positioned between the laser head and the film,
      a support plate positioned beneath the film and configured such that the film is tensioned over an upper surface of the support plate, the support plate defining an opening vertically aligned with and below the laser head, wherein the laser beam passes through the opening after penetrating the film, and
      one or more sensors positioned beneath the support plate and configured to detect if the laser beam has penetrated the film and created the one or more perforations; and
   a controller configured to control the perforation device to produce a predetermined perforation pattern comprised of the one or more perforations in the film;
   wherein the film extends continuously while moving from the dispensing device; and
   wherein the perforation device is positioned so that the film is perforated after leaving the film dispensing device and prior to the food product being wrapped in film.

2. The food packaging system of claim 1, wherein the film is a polymer film.

3. The food packaging system of claim 1, wherein the perforations are holes, slots, or slits.

4. The food packaging system of claim 1, wherein the laser emitter is a Carbon Dioxide laser generating an infrared beam that is approximately 0.25 inch in diameter on the film and a power output that is capable of burning through the material of the film, the laser emitter positioned at a lateral side relative to the film and oriented to project the beam in a horizontal direction and parallel to the film until the beam is directed in a vertical direction and perpendicular in a direction towards the film via a mirror.

5. The food packaging system of claim 1, wherein the converging lens may be adjustable in a direction parallel to an axis of the laser beam to create the one or more perforations of a desired size.

6. The food packaging system of claim 5, wherein the size of the one or more perforations is controlled by controlling the duration of the laser pulse and the power of the laser.

7. The food packaging system of claim 1, wherein a ventilation system is provided that is configured to collect any vapors or other byproducts created by the perforation device.

8. The food packaging system of claim 1, wherein the laser head is moveable along an axis by way of a shuttle mechanism, the shuttle mechanism comprising a belt that engages one or more pulleys positioned at one or both lateral sides of the film, the one or more pulleys rotated by a motor that rotationally urges the timing belt, and a slide fixed to the timing belt and carrying the laser head, wherein the laser head is moveable via the interconnection of the timing belt, the slide, and the one or more pulleys to vary the position of the laser head along an x-axis relative to the film to form the one or more perforations.

9. The food packaging system of claim 8, further comprising a pivot motor configured to rotate the laser head about a rotational axis parallel to a y-axis relative to the film, wherein the laser beam is directed at an angle instead of vertically to form the one or more perforations.

10. The food packaging system of claim 8, wherein a first row of the one or more perforations are formed with the laser head moving in a first direction and a second row of one or more perforations are formed with the laser head moving in a second direction opposite from the first direction.

11. The food packaging system of claim 1, wherein the controller is further configured to receive a signal in order to determine a speed of the film as the film moves from the dispensing device through the perforation device.

12. The food packaging system of claim 11, wherein the controller is configured to control the speed of the perforation device based on the determined speed of the film.

13. The food packaging system of claim 11, further comprising an encoder positioned on a top surface of the film, the encoder transmitting the signal to the controller.

14. The food packaging system of claim 1, wherein the one or more perforations define a diameter of approximately 75 microns.

15. The food packaging system of claim 1, further comprising the support plate opening defined as a slot with a width that is greater than a diameter of the one or more perforations.

* * * * *